US009671970B2

(12) United States Patent
Mealey et al.

(10) Patent No.: US 9,671,970 B2
(45) Date of Patent: Jun. 6, 2017

(54) SHARING AN ACCELERATOR CONTEXT ACROSS MULTIPLE PROCESSES

(71) Applicant: International Business Machines Corporation, Armonk, NY (US)

(72) Inventors: Bruce Mealey, Austin, TX (US); Mark D. Rogers, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 14/923,885

(22) Filed: Oct. 27, 2015

(65) Prior Publication Data
US 2017/0115921 A1    Apr. 27, 2017

(51) Int. Cl.
*G06F 3/06* (2006.01)
(52) U.S. Cl.
CPC .......... *G06F 3/0631* (2013.01); *G06F 3/0604* (2013.01); *G06F 3/0653* (2013.01); *G06F 3/0673* (2013.01)
(58) Field of Classification Search
CPC .... G06F 3/0631; G06F 3/0604; G06F 3/0655; G06F 3/0673
See application file for complete search history.

(56) References Cited

U.S. PATENT DOCUMENTS

| 5,251,322 | A | * | 10/1993 | Doyle | ...................... | G06T 17/00 345/501 |
| 7,818,747 | B1 | * | 10/2010 | Fedorova | .............. | G06F 9/4881 711/1 |
| 8,683,175 | B2 | | 3/2014 | Ekanadham et al. | | |
| 2002/0116597 | A1 | * | 8/2002 | Goodhue | .............. | G06F 9/3802 712/207 |
| 2007/0006047 | A1 | * | 1/2007 | Zhou | .................... | G06F 11/3636 714/38.1 |
| 2009/0106495 | A1 | * | 4/2009 | Chou | .................... | G06F 9/3004 711/130 |
| 2009/0216958 | A1 | * | 8/2009 | Biles | .................. | G06F 13/1668 711/148 |

(Continued)

OTHER PUBLICATIONS

M. Gschwind, "Optimizing Data Sharing and Address Translation for the Cell BE Heterogeneous Chip Multiprocessor", 2008 IEEE International Conference on Computer Design, 8 pages, IEEE, 2008.

(Continued)

*Primary Examiner* — Hiep Nguyen
(74) *Attorney, Agent, or Firm* — Patterson + Sheridan, LLP

(57) ABSTRACT

The present disclosure relates to sharing a context on a coherent hardware accelerator among multiple processes. According to one embodiment, in response to a first process requesting to create a shared memory space, a system creates a shared hardware context on the coherent hardware accelerator and binds the first process and the shared memory space to the hardware context. In response to the first process spawning one or more second processes, the system binds the one or more second processes to the shared memory space and the hardware context. Subsequently, the system performs one or more operations initiated by the first process or one of the one or more second processes on the coherent hardware accelerator according to the bound hardware context.

13 Claims, 10 Drawing Sheets

(56) References Cited

U.S. PATENT DOCUMENTS

2013/0262776 A1    10/2013   Asaro et al.
2015/0293776 A1*   10/2015   Persson .............. G06F 9/45558
                                                           718/1
2015/0339158 A1*   11/2015   Harris .................. G06F 9/4881
                                                          718/103

OTHER PUBLICATIONS

Ramesh, B. et al., "Regional Consistency: Programmability and Performance for Non-Cache-Coherent Systems", 2013 12th IEEE International Conference on Trust, Security and Privacy in Computing and Communications (TrustCom), 8 pages, IEEE Computer Society, 2013.

© Lockheed Martin Corporation 2008, IPCOM000171311, "Dynamically Configured Hardware Accelerator Functions", An IP.com Prior Art Database Technical Disclosure, Jun. 4, 2008, 27 pages <http://ip.com/IPCOM/000171311>.

Anonymously, "Method for Handling Page Boundary Crossings Encoundered by a Hardware Accelerator", An IP.com Prior Art Database Technical Disclosure, Sep. 24, 2010, 6 pages. <http://ip.com/IPCOM/000200051>.

Funk, M., "The Platform: Addressing Is the Secret of Power8 CAPI", Jun. 22, 2015, 11 pages <http://www.theplatform.net/2015/06/22/the-secret-of-power8-capi-is-addressing/>.

IBM "List of IBM Patents or Patent Application Treated as Related".

U.S. Appl. No. 14/987,357, entitled Sharing and Accelerating Context Across Multiple Processes, filed Jan. 4, 2016.

\* cited by examiner

SHARING AN ACCELERATOR CONTEXT ACROSS MULTIPLE PROCESSES

BACKGROUND

The present invention relates to coherent hardware accelerators, and more specifically to sharing a single context on a coherent hardware accelerator among multiple processes.

In some computer systems, accelerators may be installed to accelerate various specialized operations, such as graphics processing, encryption and decryption, compression and decompression, massively parallel processing (e.g., big data processing, fluid dynamic simulations, and so on), and other computationally expensive tasks. Traditional hardware accelerator systems may be designed as an add-on board that interfaces with a processor via a physical bus (e.g., PCI Express). As processes run on these accelerator systems, the accelerator interfaces with system memory using direct memory access in which the accelerator directly accesses regions of memory using real, rather than virtual, addresses. By accessing memory using direct memory access, an accelerator can bypass the memory management systems built into CPUs installed in a system.

Some hardware accelerators may be designed to interface with system memory using a virtual memory space established by a CPU. A process can attach to the accelerator and create a context, which includes information about the virtual memory space allocated to the process, as well as other information. While the process executes on the accelerator, the accelerator can read from and write to system memory using virtual addresses associated with the virtual memory space in lieu of direct memory access using physical memory addresses.

Accelerators may support a fixed number of hardware contexts. For example, for applications with a parent process and no or few child processes that also use the accelerator, the parent process and each of the child processes can attach to separate accelerator hardware contexts while leaving a pool of unused accelerator hardware contexts available for use by other processes. Some large applications may spawn a large number of separate child processes, which may exceed the number of hardware contexts available at the accelerator.

SUMMARY

One embodiment includes a computer-readable storage medium having instructions, which, when executed on a processor, performs an operation for multiple processes to share a hardware context established on a coherent accelerator. The method generally includes using a first process, creating a shared memory space, creating a shared hardware context on the coherent hardware accelerator, attaching the shared memory space to the shared hardware context, and binding the first process to the shared hardware context. In response to the first process spawning one or more second processes, the system binds the one or more second processes to the shared memory space and the hardware context. Subsequently, the system performs one or more operations initiated by the first process or one of the one or more second processes on the coherent hardware accelerator according to the bound hardware context.

Still another embodiment includes a processor and a memory storing a program, which, when executed on the processor, performs an operation for multiple processes to share a hardware context established on a coherent accelerator. The method generally includes using a first process, creating a shared memory space, creating a shared hardware context on the coherent hardware accelerator, attaching the shared memory space to the shared hardware context, and binding the first process to the shared hardware context. In response to the first process spawning one or more second processes, the system binds the one or more second processes to the shared memory space and the hardware context. Subsequently, the system performs one or more operations initiated by the first process or one of the one or more second processes on the coherent hardware accelerator according to the bound hardware context.

DETAILED DESCRIPTION

Embodiments presented herein describe techniques for sharing a coherent accelerator hardware context among multiple processes. By sharing a single coherent accelerator hardware context among multiple related processes, a single coherent accelerator hardware context can provide services to applications with large numbers of related processes or to applications launched by the same user. For example, a single coherent accelerator hardware context can be generated for a database system with hundreds or thousands of related processes. Doing so may leave a large pool of unused hardware contexts available for use by other applications and allows such applications to also use a single, rather than multiple, coherent accelerator devices.

In one embodiment, a hardware context includes a page table and a number of segment tables. The page table and segment tables allow the coherent accelerator to identify a location in virtual address space in which memory of a mapped process is located. The page table is a global table that maps memory pages to a given process. Further, segment tables specify which memory pages belong to which segment of a given process. Each process may include a distinct segment table in the context. In contrast to traditional PCI accelerators, applications can execute instructions that directly interface with a coherent accelerator.

Typically, the amount of hardware contexts used by the coherent accelerator is limited. For example, a coherent accelerator may include a few hundred contexts available to processes executing in the computing system. By sharing a single coherent accelerator hardware context among multiple processes, a greater number of processes may use the coherent accelerator.

Figure 1:
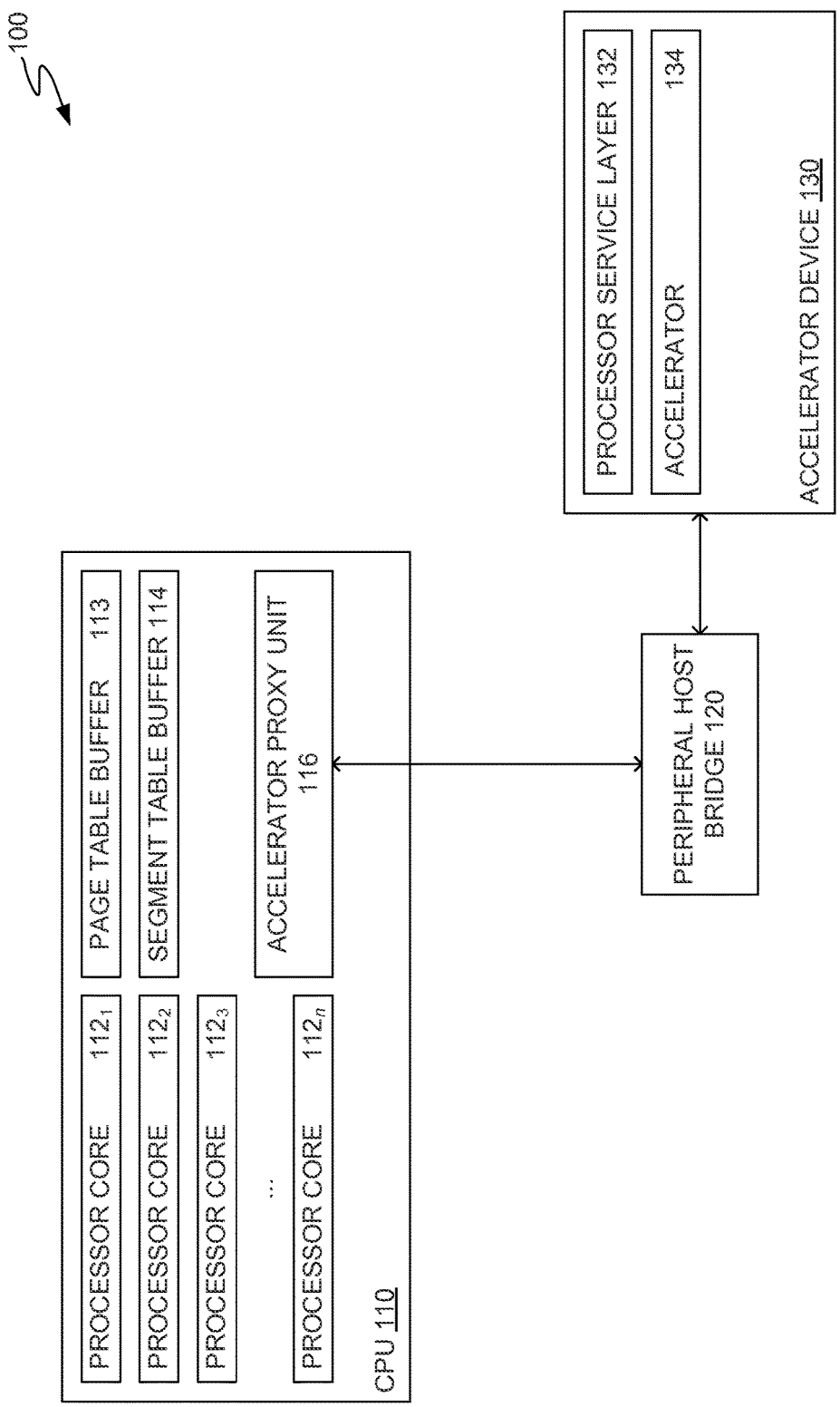
FIG. 1 illustrates an example system architecture in which an accelerator in which a processor and accelerator share a virtual memory space, according to one embodiment.

FIG. 1 illustrates an example architecture of a system 100 in which an accelerator and a CPU use the same virtual memory space (i.e., memory coherency), according to one embodiment. As illustrated, system 100 includes a CPU 110, a peripheral host bridge 120, and an accelerator device 130.

CPU 110 generally includes a number of processor cores 112, a page table buffer 113, a segment table buffer 114, and an accelerator proxy unit 116. When an accelerator-enabled application begins execution, the application generally requests a memory allocation from system memory (not pictured). CPU 110 generates a virtual memory space that points to a physical memory space in system memory, and the application performs operations by reading data from and/or writing data to system memory using addresses in the virtual memory space. In some CPU architectures, such as the POWER architecture, the virtual memory space may be divided into two separate spaces: a page table and a segment table. Segment tables may be created for each application or process and provide for memory address translation from an application or process-specific virtual address to a global virtual address. A single page table may be used to translate a global virtual address to a real memory address.

Page table buffer 113 and segment table buffer 114 is generally accessed by a processor core 112 for address translation between a virtual address and a real memory address, as discussed above. To provide for memory coherency, an accelerator device 130 accesses the same page table buffer 113 and segment table buffer 114 and performs memory accesses (i.e., read and/or write operations) using virtual, rather than physical, addresses. At CPU 110, accelerator proxy unit 116 provides an interface for an accelerator device 130 to coherently access page tables and segment tables (and the associated page table buffer 113 and segment table buffer 114). To ensure memory coherency between a CPU 110 and accelerator 130, accelerator proxy unit 116 maintains a directory of cache lines held by the accelerator device 130. As entries in page table buffer 113 and segment table buffer 114 are invalidated, accelerator proxy unit 116 may also invalidate the page table and segment table entries used by an accelerator device 130.

Peripheral host bridge 120 provides an interface between CPU 110 and accelerator device 130 that accelerator device 130 uses for coherent memory accesses (i.e., read and/or write operations). In some cases, an accelerator device 130 may physically be keyed to a standard input/output interface, such as a PCI Express interface. Peripheral host bridge 120 generally includes logic that allows a coherent accelerator device 130 to communicate with a CPU 110 via an accelerator proxy unit 116, as described above.

Accelerator device 130 may include a processor service layer 132 and an accelerator 134. As described above, accelerator device 130 may be connected to a CPU 110 via a physical interface, such as PCI Express interface, and may communicate with a CPU via an accelerator proxy unit 116 to ensure memory coherency between the CPU 110 and accelerator device 130.

Processor service layer 132 and accelerator 134 may be constructed on a single field programmable gate array (FPGA). Processor service layer 132 generally provides a memory management unit that accelerator 134 uses to translate virtual addresses to real addresses, using the page tables and/or segment tables shared with CPU 110. After translating virtual addresses to real addresses, processor service layer 132 performs memory read/write operations and provides read data to accelerator 134 for further processing. In some cases, processor service layer 132 may additionally include a data cache that an accelerator can use to store cacheable data for faster access to such data. Processor service layer 132 may be implemented on a small portion of an FPGA, leaving the bulk of the FPGA available for the core functionality of accelerator 134 (i.e., the specialized logic programmed on an FPGA for specialized tasks).

Figure 2:
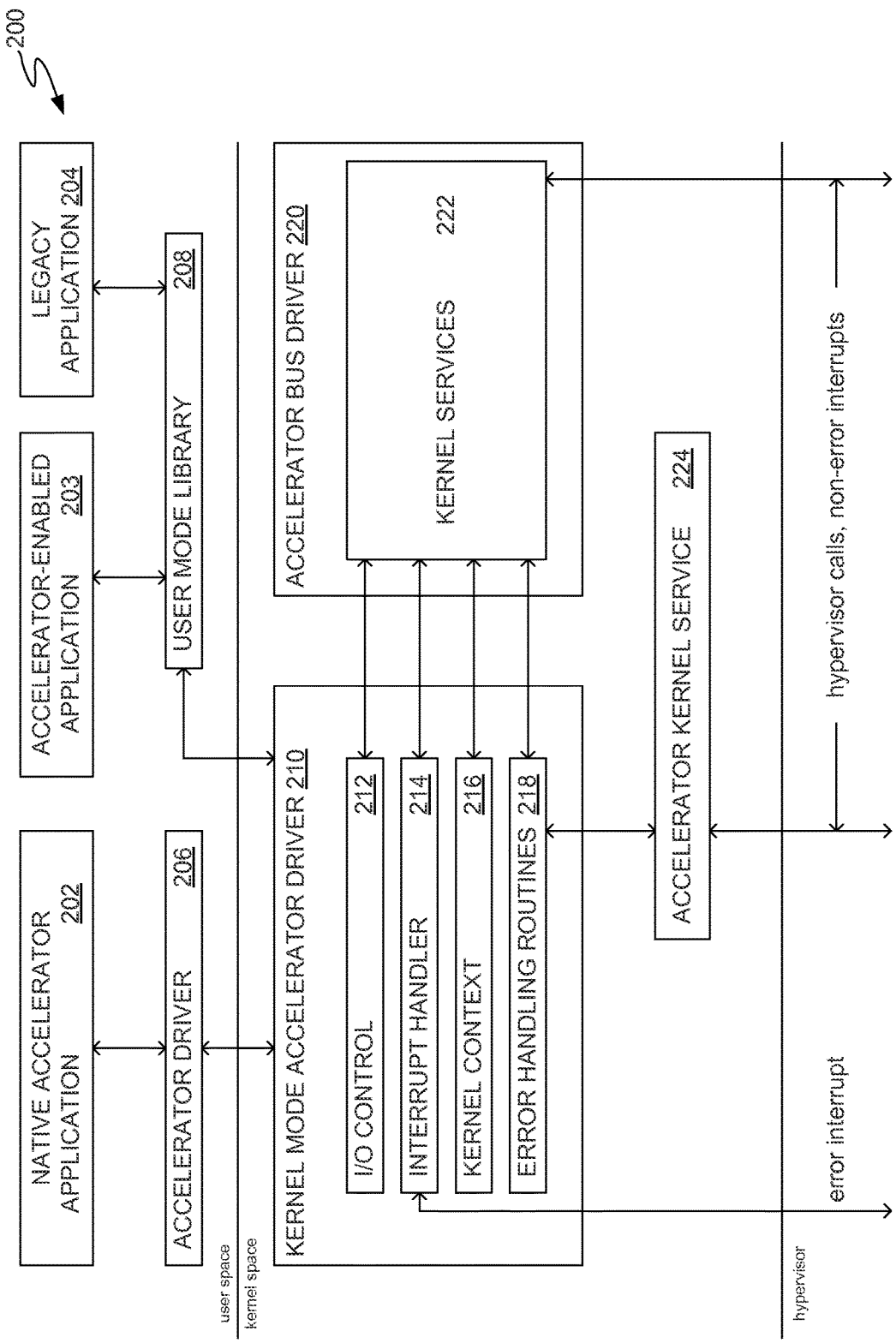
FIG. 2 illustrates an example process architecture for interfacing with an accelerator that uses a processor virtual memory space, according to one embodiment.

FIG. 2 illustrates an example process architecture 200 for interfacing with a coherent accelerator that uses the same virtual memory space as a CPU, according to one embodiment. As illustrated, process architecture 200 may be divided into a user space, a kernel space, and a hypervisor space.

Applications with varying degrees of accelerator awareness may execute in the user space. A native accelerator application 202 may contain a full user-mode accelerator driver 206 inside the native accelerator application 202 and use its own context on an accelerator 130. Accelerator-enabled applications 203, which can optionally use an accelerator 130, and legacy applications 204, which may be unaware of accelerator functionality, can communicate with an accelerator using a user-mode library 208. Accelerator functionality may be encapsulated within user mode library 208. For accelerator-enabled applications 203, each application may share an accelerator hardware context or use its own accelerator hardware context. For legacy applications 204, a small number of kernel contexts may be established on the accelerator, and the legacy applications 204 may share these kernel contexts. The number of legacy applications 204 that can share a kernel context may be a fixed number defined by the operating system on which the legacy applications 204 execute.

In the kernel space, a kernel mode accelerator driver 210 provides I/O control 212, an interrupt handler 214, a kernel context 216, and error handling routines 218 to a native accelerator application 202 or to a user mode library 208 through which accelerator-enabled applications 203 and legacy applications 204 interact with a memory-coherent accelerator 130. I/O control 212, interrupt handler 214, kernel context 216, and error handling routines can transmit messages to an accelerator bus driver 220 to communicate with an accelerator 130. For example, I/O control 212 and interrupt handler can transmit enhanced error handling messages to accelerator bus driver 220 to obtain data about the error handling capabilities of an accelerator 130. Interrupt handler 214 can additionally raise error interrupts and transmit the error interrupts to the hypervisor space for further handling.

Error handling routines 218 can transmit and receive enhanced error handling messages from accelerator bus driver 220. Error handling routines 218 can pass the received error handling messages to accelerator kernel service 224 for further processing (e.g., error recovery). As part of processing the received error handling messages, accelerator kernel service can perform hypervisor calls and inject non-error interrupts into the system.

Accelerator bus driver 220 generally includes a kernel services module 222. Kernel services module 222 may provide enhanced error handling services to kernel mode accelerator driver 210, as discussed above. Additionally, kernel services module 222 may provide direct memory access functionality to kernel mode accelerator driver 210.

Figure 3:
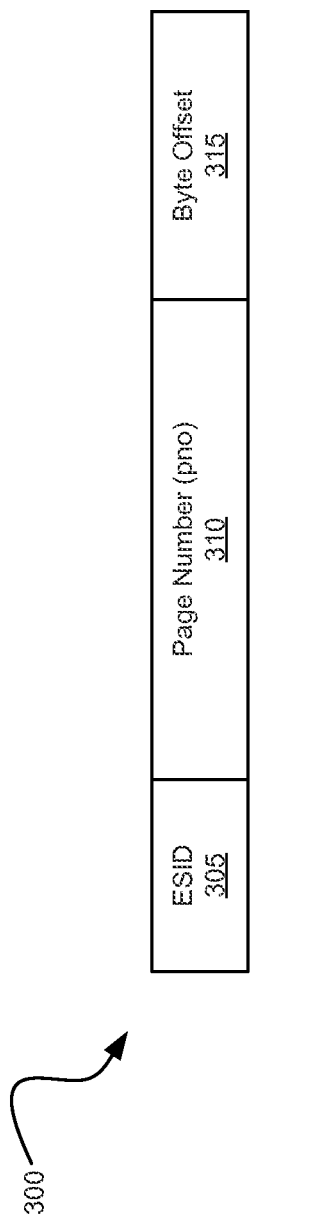
FIG. 3 illustrates an example layout of an effective address, according to one embodiment.

FIG. 3 illustrates an example layout of an effective address 300, according to one embodiment. As shown, the effective address 300 includes an effective segment identifier (ESID) 305, a page number (pno) 310, and a byte offset 315. The ESID 305 specifies a segment in a process effective address space that the effective address 300 belongs to. A given segment may include a range of addresses. For example, in a 32-bit effective address space, an ESID 305 of 0x0 may include a range of addresses 0x0000_0000 to 0x0FFF_FFFF, an ESID 305 of 0x1 may include a range of addresses 0x1000_0000 to 0x1FFF_FFFF, and so on.

Further, the pno 310 specifies an index of a page within that segment. The byte offset 315 specifies an offset of a byte within that page. In practice, for a 32-bit effective address, an ESID 305 of 4 bits, a pno 310 of 16 bits, and a byte offset 315 of 12 bits have shown to be effective. For a 64-bit effective address, an ESID 305 of 36 bits, a page number of 16 bits, and a byte offset of 12 bits has shown to be effective.

Figure 4:
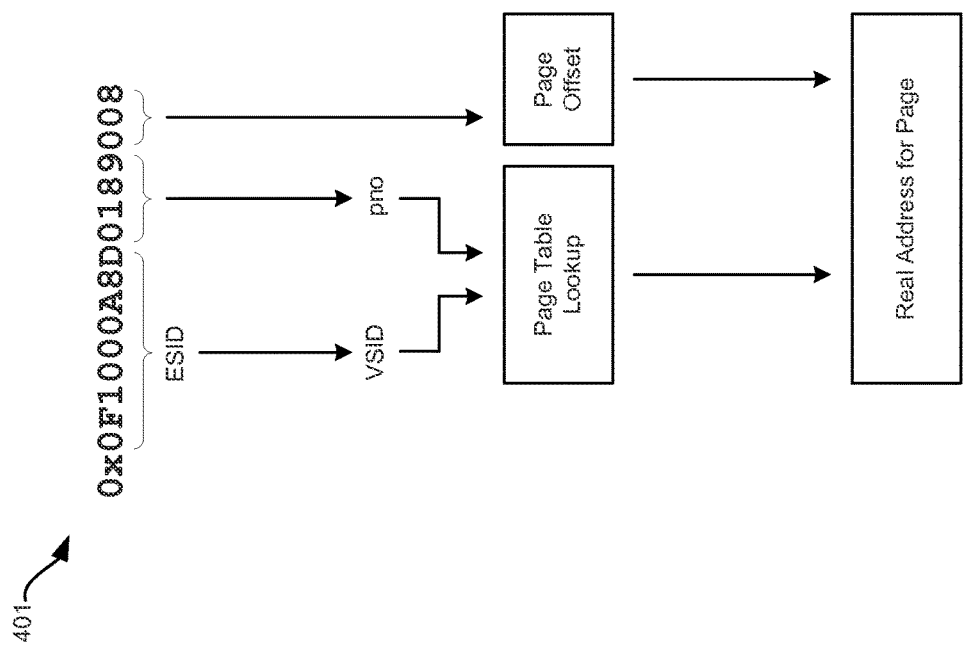
FIG. 4 illustrates an example flow of translating an effective address to a real address, according to one embodiment.

FIG. 4 illustrates an example flow of translating an effective address to a real address in a shared kernel context, according to one embodiment. The kernel device driver may receive a request, e.g., from a process configured to issue bus commands, to perform I/O on a given storage device attached to the kernel device driver. The request may specify an effective address, as depicted by the effective address 401 of 0x0F1000A8D0189008. Illustratively, the portion '0F1000A8D' represents the ESID of the effective address 401. The portion '0189' represents the pno of the effective address 401, and the '008' portion represents the page offset of the effective address 401.

In one embodiment, the kernel device driver translates the ESID of the effective address to a corresponding VSID. To do so, the kernel device driver determines a mapping of the effective address of the process to an effective address in the shared kernel context. Doing so allows the kernel device driver to determine the corresponding VSID from the global segment table using the effective address of the shared kernel context. As stated, the global segment table of the kernel may include mappings between ESIDs and VSIDs. The coherent accelerator determines a corresponding VSID based on the mappings in the global segment table. Once the VSID is identified, the coherent accelerator then performs a lookup in the page table using the VSID and pno combination. The coherent accelerator then applies the byte offset in the page resulting from the lookup. As a result, the coherent accelerator can obtain a real address of the application memory of a specific process.

In one embodiment, in addition to remapping the effective address to a real address, the kernel device driver may build a proper command based on the I/O request and queue the command to a command and response queue. Similar to a traditional I/O stack, the application may block other I/O until the queued command completes. The kernel device driver may determine whether to release the I/O before recovering the storage device and then restarting or redriving the I/O.

Figure 5:
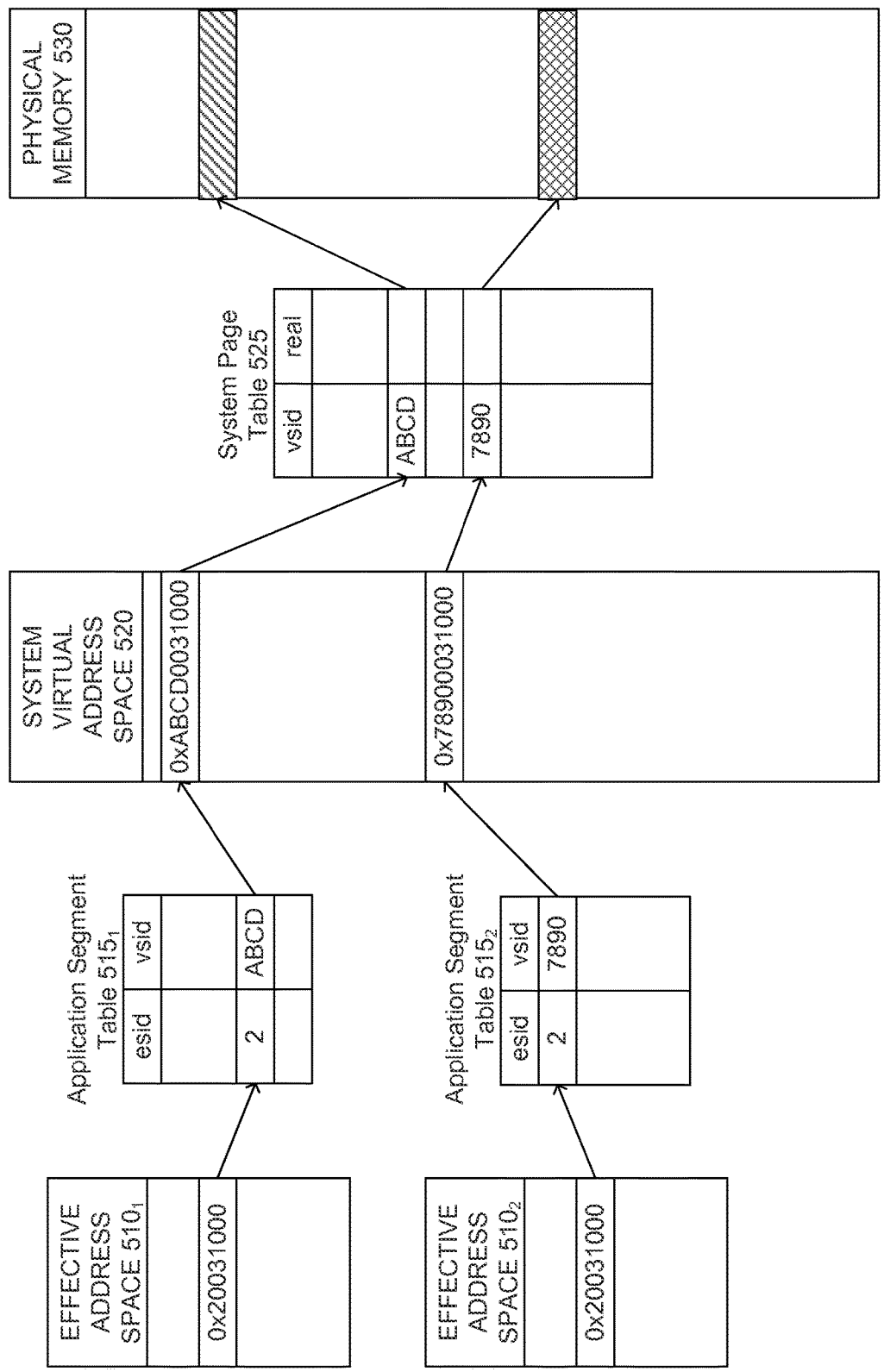
FIG. 5 illustrates an example memory system architecture in which a processor and accelerator can read from or write to memory using virtual addresses, according to one embodiment.

FIG. 5 illustrates an example memory structure in which a CPU 110 and accelerator device 130 can use virtual addresses in segment and page tables to read from and write to physical memory, according to one embodiment. As illustrated, each process (and the kernel, which is not illustrated) may have its own unique effective address space 510. An address generated by a process is an effective address. An effective address may be mapped to an address in a system wide virtual address space 520, which then may be mapped to a real address in physical memory 530.

As illustrated, to obtain a system virtual address from an effective address, a CPU or accelerator can access an application segment table 515 specific to the process that owns an effective address space. The application segment table 515 generally contains a mapping from an effective segment ID to a virtual segment ID. For example, with a 32-bit address as illustrated in FIG. 5, the first four bits of an address may represent a segment in an effective address space 510 and may be mapped to a virtual segment in system virtual address space 520. As illustrated, effective segment ID 2 for the process that owns effective address space $510_1$ may be mapped to virtual segment ID ABCD, while the same effective segment ID for the process that owns effective address space $510_2$ may be mapped to virtual segment ID 7890.

In the system virtual address space 520, the effective segment identifier from effective address space 510 may be replaced with the virtual segment identifier based on the mapping in application page table 515. For example, effective memory address 0x20031000 for the process that owns effective address space $510_1$ may map to system virtual memory address 0xABCD0031000, while the same effective memory address for the process that owns effective address space $510_2$ may map to system virtual memory address 0x78900031000.

Using system page table 525, the system virtual memory address may be translated to a real memory address in physical memory 530. For example, a virtual memory address may be separated into three components: a segment ID, a page number within the identified segment, and a byte offset within the page. A CPU or accelerator can look up the virtual segment ID and page number in system page table 525 to obtain the real or logical address of a page and add the page offset to the page address to obtain the real or logical address for a particular system virtual address.

During context switches (e.g., from a first application with effective address space $510_1$ to a second application with effective address space $510_2$), segment tables may need to be updated to reflect the appropriate mappings between effective and system wide virtual addresses. Segment table updates may be performed at the kernel level during a context switch.

Figure 6:
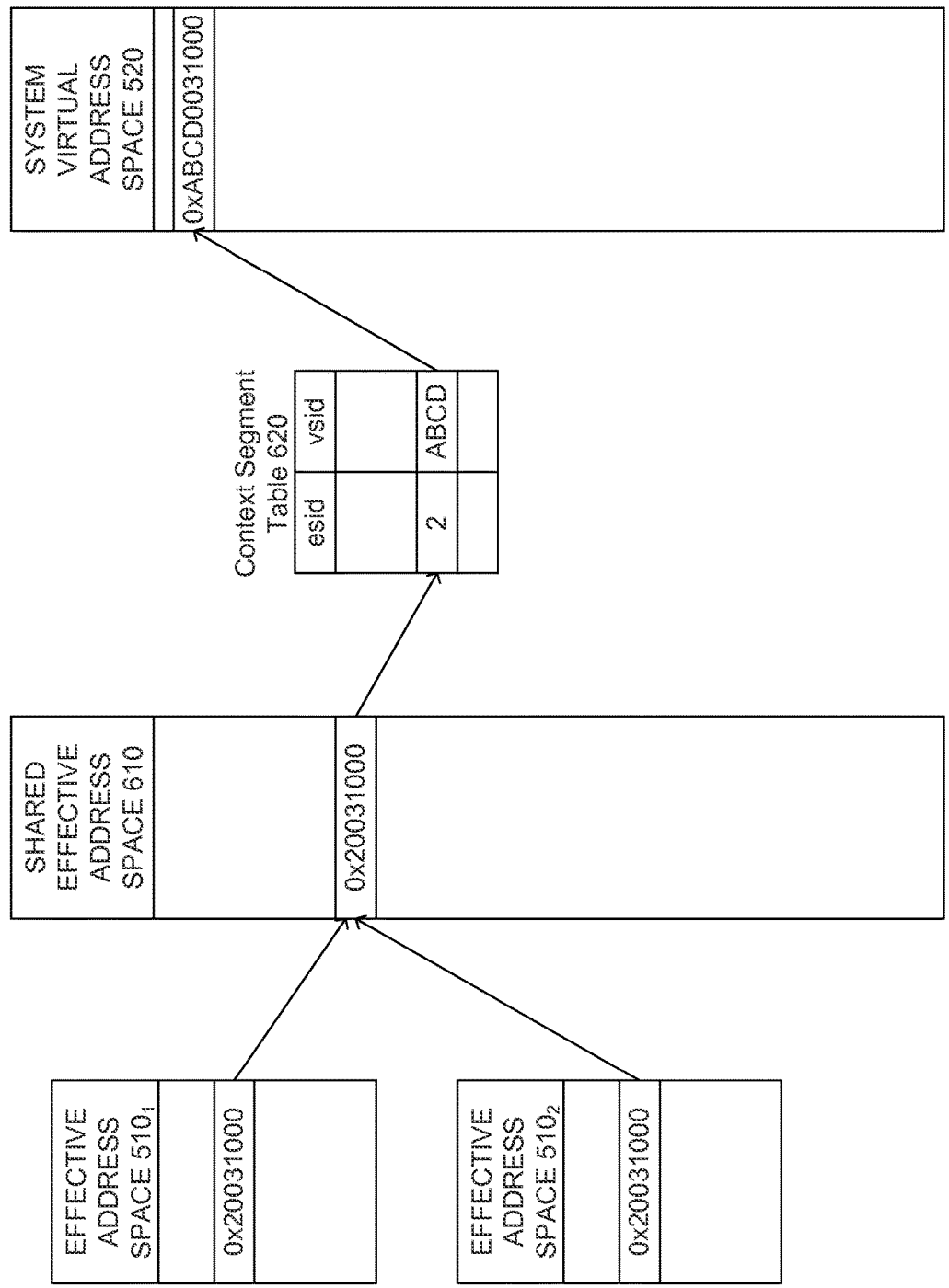
FIG. 6 illustrates an example memory system architecture in which multiple processes share a virtual address space, according to one embodiment.

As illustrated in FIG. 6, an accelerator context can have a shared effective address space 610. Multiple processes, each owning an individual effective address space 310, may be mapped to the same portion of the shared effective address space 610. Shared effective address space 610 may be associated, for example, with a single accelerator hardware context, and processes using the shared effective address space 610 may share the single accelerator hardware context. For example, as illustrated, an effective address 0x20031000 in effective address space $510_1$ owned by a first process and the same effective address in effective address space $510_2$ may be mapped to a memory address (as illustrated, also 0x20031000) in the shared effective address space 610. A context segment table 620 contains mappings between the effective segment IDs from the shared effective address space 610 and the virtual segment IDs used in system virtual address space 520.

As discussed, some applications may spawn hundreds or thousands of related processes (child processes). For example, a database application that works with large quantities of data and is required to concurrently serve a large number of clients may spawn a large number of related processes while servicing each client. Because an accelerator may only support a limited number of hardware contexts, assigning a hardware context to each process spawned by an application may result in a single application using all of the available hardware contexts on an accelerator system even though the processes are related and may generally access related data in system memory. Additionally, a single application that spawns a large number of child processes may use substantially all of the available accelerator hardware contexts, leaving a small number or no contexts available for other applications that may also benefit from accelerator acceleration.

To allow related processes to share a single accelerator hardware context, a parent process may establish a shared accelerator hardware context with a memory allocation. The memory allocation may be mapped by the parent process and reside in an effective address space associated with the shared accelerator hardware context (and parent process). As the parent process spawns and ends child processes and as memory requirements change, additional memory regions can be added to or removed from the effective address space. When the parent process is terminated, the child processes associated with the parent process may also be terminated, the shared accelerator hardware context may be released and made available for reuse, and the memory regions used by the parent process and child processes may be released.

Figure 7:
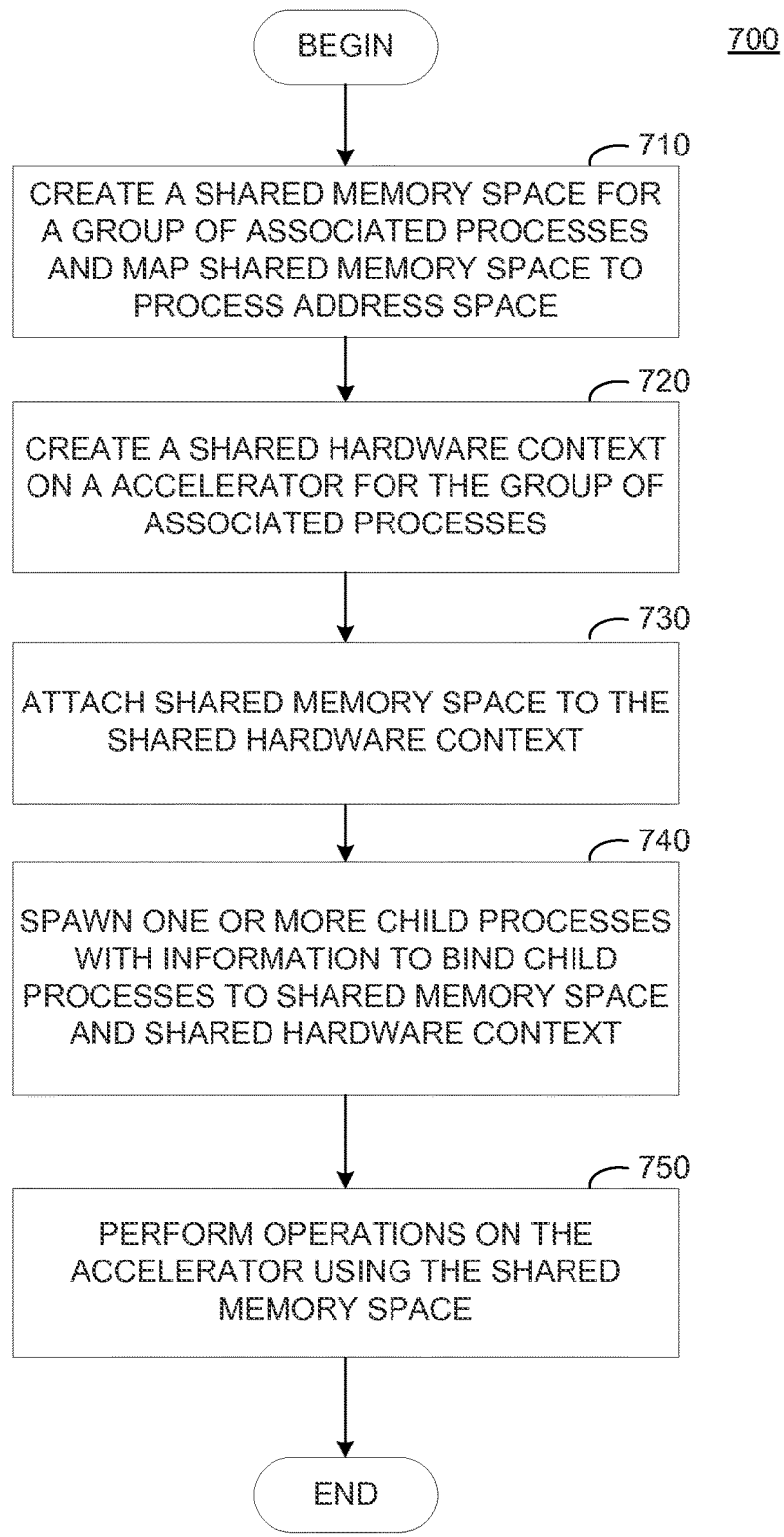
FIG. 7 illustrates example operations that may be performed by a first process to attach to an accelerator hardware context and spawn child processes that can attach to the same accelerator hardware context, according to one embodiment.

FIG. 7 illustrates example operations that may be performed by a parent process to establish a shared accelerator hardware context for use by the parent process and one or more child processes spawned by the parent process at a later time, according to one embodiment.

Operations 700 begin at step 710, where the parent process creates a shared memory space for a group of associated processes. In one case, the process may create a shared memory space by using the shmget (shared memory get/create) method, which creates a shared memory space based on a key value and an initial size for the shared memory space. If a memory space associated with the key does not exist (which would be expected for the parent process), the process creates a shared memory space associated with the provided key and having a size of the provided initial size. Once the shared memory space is created using shmget, the parent process may use the shmat method to map the shared memory region into the address space of the parent process.

At step 720, the parent process creates a shared hardware context on an accelerator for the group of associated processes. To create the shared hardware context, the parent process can use the shc_create method, which takes a key to identify the context and authenticate to the shared hardware context. If a context associated with the key does not exist, the shc_create method creates the shared hardware context. The shc_create method may increment a counter that indicates the number of processes that are currently attached to the shared hardware context. The shared hardware context may not be deleted, using shc_delete, until the last process using the shared context (e.g., the counter indicates that a single process is using the shared context) calls shc_delete.

Once the shared hardware context is created, at step 730, the process attaches the shared memory space to the shared hardware context. For example, to attach the shared memory space to the shared hardware context, the shc_insert (shared hardware context insert) method may be used. The shc_insert method inserts an address range into an identified context to attach the shared memory segment to the address space of the hardware context. In attaching the shared memory space to the shared hardware context, the shc_insert method generally takes the address space created using shmat and inserts the esids and vsids for the address space into the segment table for the shared hardware context. When the shc_insert method attaches the shared memory segment to the shared hardware context, the shc_insert method may track the processes that have performed the shc_insert method for each esid in the shared hardware context. Once inserted into a shared hardware context, the shared memory space mapped to an esid may not be detached (e.g., using shmdt [the shared memory detach method]) by a process until the process removes its mapping of the shared memory from the shared hardware context (e.g., using shc_remove).

At step 740, the parent process spawns one or more child processes. When the parent process spawns a child process (e.g., using the fork method), the spawning operation automatically binds the child process to the shared memory space and hardware context created by the parent process at steps 710-730. In spawning the child processes, the child processes use the same context ID associated with the context created by the parent process using shc_create and the same shared memory space created by the parent process using shmget. As discussed above, the parent process may continually spawn and terminate child processes as needed to accommodate changes in system usage. For example, for a database system that uses a coherent accelerator, the parent process may spawn additional processes as demand for data from the database increases. As demand for data decreases, some of the excess processes may be terminated.

At step 750, the parent process performs operations on the accelerator using the shared memory space. As discussed above, because the accelerator and CPU are coherently attached, read and write operations performed using the accelerator use the same memory space. For example, processes executing on an accelerator installed in a POWER architecture system can use a process-specific effective virtual address to perform operations on system memory. As discussed above, the accelerator can use the same segment and page tables as the CPU to determine the real (physical) memory address associated with an effective virtual address and perform read and/or write operations on the location identified by the effective virtual address.

Figure 8:
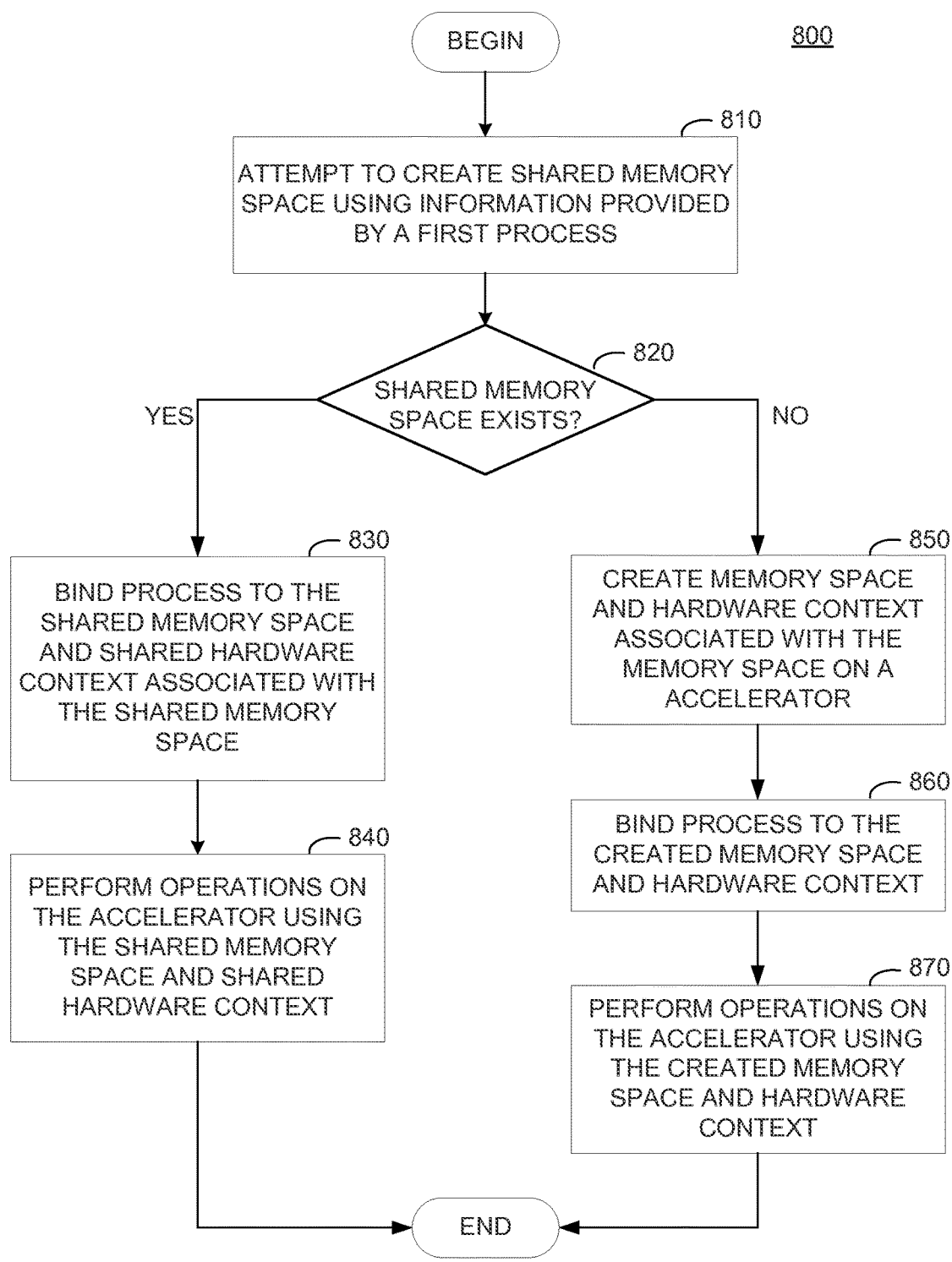
FIG. 8 illustrates example operations that may be performed by a second process to attach to an accelerator hardware context created by a first process, according to one embodiment.

FIG. 8 illustrates example operations 800 that may be performed by a second process to attach to an accelerator hardware context created by a first process, according to one embodiment. In some cases, the first and second processes may be unrelated apart from having been launched by the same user. Operations 800 begin at step 810, where the second process attempts to create a shared memory space using information (e.g., a unique key associated with a memory space) provided by a first process. Like the operations performed at the first process, the second process can, for example, use the shmget method to attempt to create a shared memory space using a key provided by the first process.

At step 820, the second process determines whether the shared memory space already exists. The second process can determine whether the shared memory space exists, for example, based on information returned by the shmget method. If the shmget method returns information about the shared memory space associated with the provided key, the second process can determine that the shared memory space exists (i.e., has already been created by the first process), and at step 830, the second process binds itself to the shared memory space and shared hardware context associated with the shared memory space. To bind to the shared hardware context, the second process attempts to create a hardware context using the shc_create method and a key identifying the context created by the first process. Because the hardware context identified by the key should already exist, shc_create does not create a new hardware context, but returns the hardware context created by the first process. After finding the shared memory space and hardware context, the second process can insert the memory space into the hardware context using shc_insert. Because the shared memory space has already been inserted into the shared context, shc_insert tracks that the second process has also inserted a set of esids associated with the shared memory space into the shared hardware context. Subsequently, at step 840, the second process performs operations on the accelerator using the shared memory space and shared hardware context. Because the second process uses the same shared memory space and shared hardware context as the first process, only one hardware context is used across the first and second processes.

If, at step 820, the second process determines that the shared memory space does not exist, at step 830, the second process creates a memory space (as a result of the shmget method) and a hardware context associated with the memory space on an accelerator (using the shc_create method). As discussed above, the second process can create the memory space and hardware context using the shmget and shmat methods. At step 840, the second process binds itself to the created memory space and hardware context (as discussed above, using shc_insert), and at step 850, the second process performs operations on the accelerator using the created memory space and hardware context.

Because coherent accelerators use address translation hardware to translate virtual addresses to physical addresses, these accelerators may incur page faults when a memory page mapped to a virtual address space is not loaded into system memory. Typically, a page fault handler executes in the context of the process that generated the page fault. However, to resolve a page fault generated by an accelerator, the accelerator may need to interrupt a CPU to resolve the page fault. To resolve page faults at the accelerator level, page faults are processed by kernel process created when the process creates a shared context.

Figure 9:
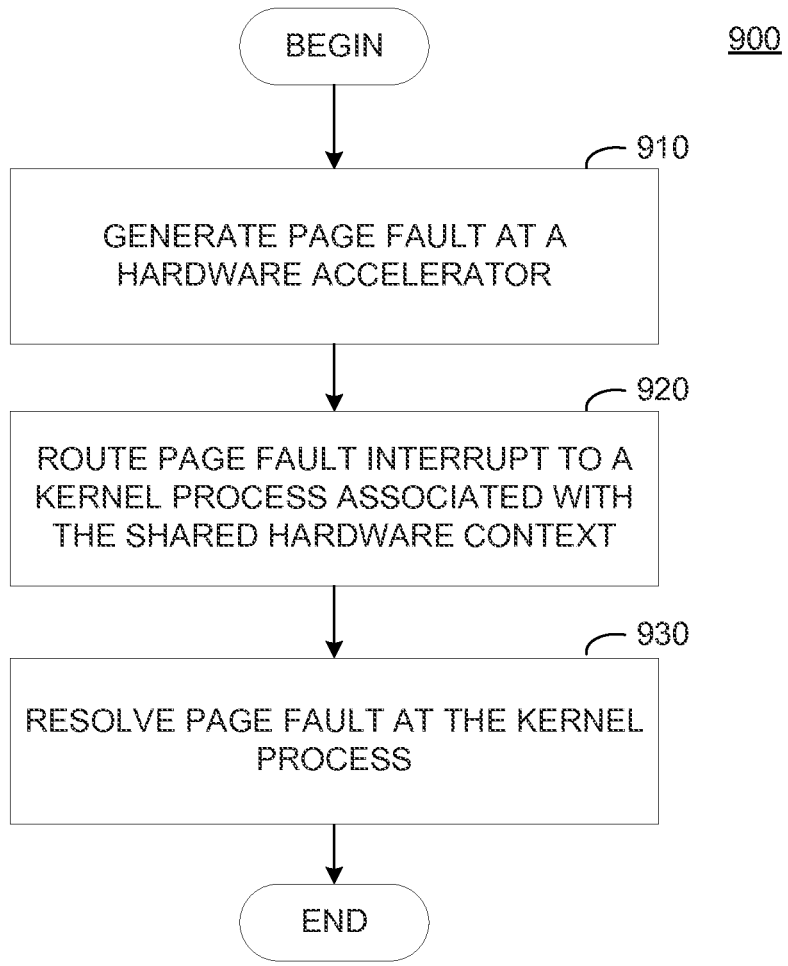
FIG. 9 illustrates example operations that may be performed by a process sharing an accelerator hardware context with other processes to resolve a page fault, according to one embodiment.

FIG. 9 illustrates example operations 900 that may be performed by a process to resolve page faults generated while a process executes in a shared context on an accelerator, according to one embodiment. As illustrated, operations 900 begin at step 910, where the coherent hardware accelerator generates a page fault. The page fault may be generated, for example, when a process bound to a shared hardware context associated with the coherent hardware accelerator attempts to access a location in a virtual memory space (e.g., an esid or vsid) that has not been loaded into physical memory.

At step 920, the coherent hardware accelerator triggers an interrupt and routes the page fault interrupt to a kernel process associated with the shared hardware context. At step 930, the kernel process resolves the page fault. In resolving the page fault, the kernel process can load the memory page associated with the requested virtual address (e.g., effective virtual address or systemwide virtual address) into main memory. After the kernel process resolves the page fault, the kernel process restarts the shared hardware context that generated the page fault.

In some cases, a kernel process may be multithreaded. As different processes trigger page faults from performing operations on various virtual memory addresses that are not loaded into physical memory, individual threads in the kernel processes can be used to resolve a page fault generated by one of the one or more processes mapped to the accelerator hardware context. In this way, a kernel process associated with an accelerator hardware context can resolve multiple page faults concurrently.

Figure 10:
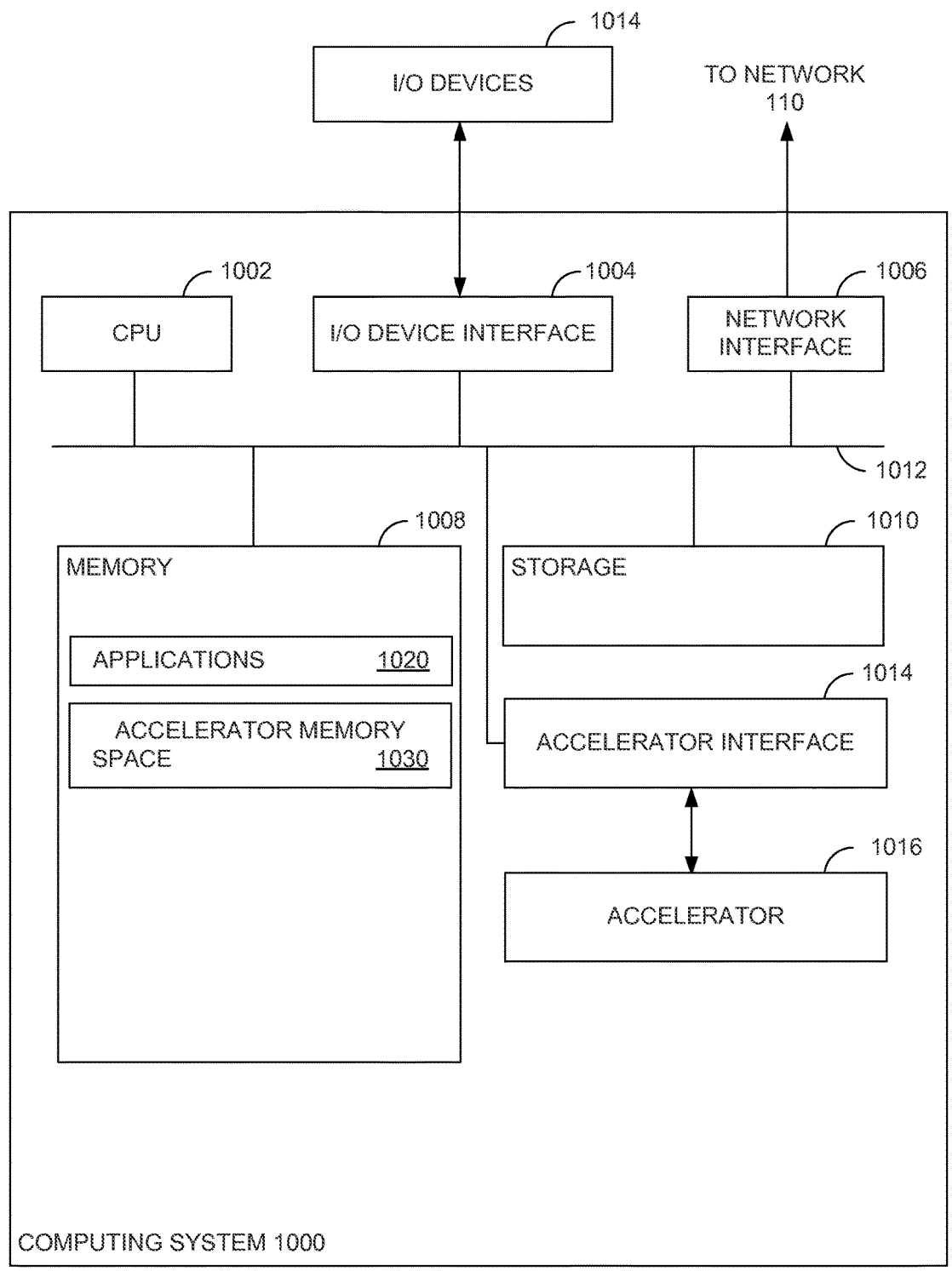
FIG. 10 illustrates an example system in which multiple processes can share a single accelerator hardware context, according to one embodiment.

FIG. 10 illustrates an example computing system 1000 that shares a single accelerator hardware context among multiple related processes, according to an embodiment. As shown, the server includes, without limitation, a central processing unit 1002, one or more I/O device interfaces 1004, which may allow for the connection of various I/O devices 1014 (e.g., keyboards, displays, mouse devices, pen input, etc.) to the computing system 1000, network interface 1006, a memory 1008, storage 1010, accelerator interface 1014, accelerator 1016, and an interconnect 1012.

CPU 1002 may retrieve and execute programming instructions stored in the memory 1008. Similarly, the CPU 1002 may retrieve and store application residing in the memory 1008. The interconnect 1012 transmits programming instructions and application data among the CPU 1002, I/O device interface 1004, network interface 1006, memory 1008, and storage 1010. CPU 1002 is included to be representative of a single CPU, multiple CPUs, a single CPU having multiple processing cores, and the like. Additionally, the memory 1008 is included to be representative of a random access memory. Furthermore, the storage 1010 may be a disk drive. Although shown as a single unit, the storage 1010 may be a combination of fixed and/or removable storage devices, such as fixed disc drives, removable memory cards or optical storage, network attached storage (NAS), or a storage area-network (SAN).

Accelerator interface 1014 generally allows one or more accelerators 1016 installed in computing system 1000 to coherently access and perform operations on system memory 1008. As discussed above, an accelerator interface 1014 may provide an interface to a coherent processor proxy unit at CPU 1002 to allow the accelerator to share the segment and page tables established by CPU 1002 for operations on system memory. As processes execute on a CPU 1002 or an accelerator 1016 and change the state of the segment and/or page tables, changes made by one of the CPU 1002 or accelerator 1016 may be propagated to the other of CPU 1002 or accelerator 1016.

As shown, memory 1008 includes one or more applications 1020 and a shared memory space 1030. Shared memory space 1030 may be a virtual address space common to both the CPU 1002 and accelerator 1016 so as to provide for memory coherence between the CPU 1002 and accelerator 1016. As discussed above, applications may use an accelerator 1016 through accelerator interface 1014 by establishing a shared memory space 1030 and binding processes associated with the application to the shared memory space 1030 and a single accelerator hardware context. By binding a multiple processes to a single shared memory space 1030 and a single accelerator hardware context, applications that spawn multiple related processes and use the same memory space need not use all or most of the available contexts available on an accelerator 1016. A relatively large pool of available contexts may thus be available for use by other applications 1030 to take advantage of specialized processing power provided by an accelerator 1016.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product, comprising:
a computer-readable storage medium having computer readable program code embodied therewith, the computer readable program code configured to perform an operation for sharing, by multiple processes, a hardware context established on a coherent hardware accelerator, the operation comprising:
in response to using a first process:
creating a shared memory space,
creating a shared hardware context on the coherent hardware accelerator,
attaching the shared memory space to the shared hardware context, and
binding the first process to the shared hardware context;
in response to the first process spawning one or more second processes, binding the one or more second processes to the shared memory space and the hardware context; and
performing one or more operations initiated by the first process or one of the one or more second processes on the coherent hardware accelerator according to the bound hardware context.

2. The computer program product of claim 1, wherein creating the shared hardware context comprises:
generating a key identifying the shared hardware context; and providing the key to the first process.

3. The computer program product of claim 2, wherein binding the one or more second processes to the shared hardware context comprises allowing the one or more second processes to access the shared memory space attached to the shared hardware context.

4. The computer program product of claim 1, wherein creating the shared hardware context comprises launching a kernel process associated with the shared hardware context to resolve faults generated while performing operations on the coherent hardware accelerator.

5. The computer program product of claim 1, wherein the operations further comprise:
detecting a page fault generated by an operation executed on the coherent accelerator by one of the first process or one or more second processes; and
resolving the page fault.

6. The computer program product of claim 5, wherein the kernel process is configured to process multiple page faults simultaneously.

7. A system, comprising:
a processor; and
memory storing one or more instructions which, when executed by the processor, performs an operation for sharing, by multiple processes, a hardware context established on a coherent hardware accelerator, the operation comprising:
using a first process:
creating a shared memory space,
creating a shared hardware context on the coherent hardware accelerator,
attaching the shared memory space to the shared hardware context, and
binding the first process to the shared hardware context;
in response to the first process spawning one or more second processes, binding the one or more second processes to the shared memory space and the hardware context; and
performing one or more operations initiated by the first process or one of the one or more second processes on the coherent hardware accelerator according to the bound hardware context.

8. The system of claim 7, wherein creating the shared hardware context comprises:
generating a key identifying the shared hardware context; and providing the key to the first process.

9. The system of claim 8, wherein binding the one or more second processes to the shared hardware context comprises allowing the one or more second processes to access the shared memory space attached to the shared hardware context.

10. The system of claim 7, wherein creating the shared hardware context comprises launching a kernel process associated with the shared hardware context to resolve faults generated while performing operations on the coherent hardware accelerator.

11. The system of claim 7, wherein the operations further comprise:
detecting a page fault generated by an operation executed on the coherent accelerator by one of the first process or one or more second processes; and
resolving the page fault using a kernel process.

12. The system of claim 11, wherein resolving the page fault comprises:
loading a memory page associated with an address that caused the page fault into the shared memory space.

13. The system of claim 11, wherein the kernel process is configured to process multiple page faults simultaneously.

* * * * *